(12) United States Patent
Kobayashi

(10) Patent No.: US 7,590,296 B2
(45) Date of Patent: Sep. 15, 2009

(54) IMAGE CODING APPARATUS AND METHOD IN WHICH A LOOP FILTER PERFORMS A FILTERING PROCESS ON EACH IMAGE BLOCK OF AN IMAGE

(75) Inventor: Satoru Kobayashi, Bunkyo-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 685 days.

(21) Appl. No.: 11/238,703

(22) Filed: Sep. 29, 2005

(65) Prior Publication Data

US 2006/0078209 A1    Apr. 13, 2006

(30) Foreign Application Priority Data

Oct. 12, 2004    (JP)    ............... 2004-297707

(51) Int. Cl.
G06K 9/36    (2006.01)
G06K 9/46    (2006.01)
G06K 9/40    (2006.01)

(52) U.S. Cl. ...................... 382/238; 382/268
(58) Field of Classification Search ............ None
See application file for complete search history.

(56) References Cited

U.S. PATENT DOCUMENTS

| 5,565,921 | A |   | 10/1996 | Sasaki et al. |         |
|-----------|---|---|---------|---------------|---------|
| 5,737,451 | A | * | 4/1998  | Gandhi et al. | 382/268 |
| 5,974,197 | A | * | 10/1999 | Lee et al.    | 382/268 |
| 6,320,987 | B1 | * | 11/2001 | Chu          | 382/260 |
| 6,950,473 | B2 | * | 9/2005  | Kim et al.   | 375/240.29 |
| 6,983,079 | B2 | * | 1/2006  | Kim          | 382/275 |
| 7,003,174 | B2 | * | 2/2006  | Kryukov et al. | 382/266 |
| 7,095,787 | B2 | * | 8/2006  | Kadono et al. | 375/240.27 |
| 7,212,571 | B2 | * | 5/2007  | Bhaskaran et al. | 375/240.03 |
| 7,397,853 | B2 | * | 7/2008  | Kwon et al.  | 375/240.03 |
| 2005/0084012 | A1 | * | 4/2005 | Hsu et al.   | 375/240.12 |

FOREIGN PATENT DOCUMENTS

| JP | 6-311499 A | 11/1994 |
|----|------------|---------|
| JP | 9-187005 A | 7/1997  |

OTHER PUBLICATIONS

"Adaptive Deblocking Filter", P. List, A. Joch, J. Lainema, G. Bjontegaard and M. Karczewicz, IEEE Trans. Circuits and Systems for Video Technology, vol. 13, No. 7, Jul., 2003, pp. 614-619.*

* cited by examiner

*Primary Examiner*—Yuzhen Ge
(74) *Attorney, Agent, or Firm*—Canon U.S.A. Inc., I.P. Division (57) ABSTRACT

An image coding apparatus includes an image characteristic determination unit configured to divide input image data into image blocks each including a plurality of pixels, and to determine a characteristic of each image block, a loop filter configured to perform a filtering process on each image block in a locally decoded image associated with the input image, and a control unit configured to control a property of the loop filter to perform a filtering process on image regions into which the image blocks are sorted according to characteristics of the image blocks determined by the image characteristic determination unit.

17 Claims, 9 Drawing Sheets

■ SLICE #0

▦ SLICE #1

▢ SLICE #2

■ SLICE #0
■ SLICE #1
□ SLICE #2

(c)

(b)

(a)

IMAGE CODING APPARATUS AND METHOD IN WHICH A LOOP FILTER PERFORMS A FILTERING PROCESS ON EACH IMAGE BLOCK OF AN IMAGE

BACKGROUND OF THE INVENTION

1. Field of the Invention

The present invention relates to an image coding apparatus and an image coding method and, more particularly, to techniques of controlling a loop filter in an image coding apparatus and an image coding method, which employ the H.264 image coding system.

2. Description of the Related Art

Coding systems, such as Motion-JPEG (Joint Photographic Experts Group), MPEG-1 (Moving Picture Experts Group), and MPEG-2, have been established as techniques for highly efficiently coding moving images. Each manufacturer has developed and commercialized image capture apparatuses, such as a digital still camera and a digital video camera, and DVD (digital versatile disk) recorders, which utilize these coding systems and are thus capable of storing moving images. Users can easily view moving images by using these apparatuses, personal computers, or DVD players.

Meanwhile, an amount of data representing digitalized moving images is enormous. Thus, studies of a moving image coding system capable of achieving higher compression of moving images than the MPEG-1 and the MPEG-2 have been being conducted. Recently, ITU-T (International Telecommunication Union—Telecommunication sector) and ISO (International Organization for Standardization) have developed the H.264 standard and the MPEG-4 Part 10 standard, respectively, which are technically identical, as the standard of such a coding system.

Figure 9:
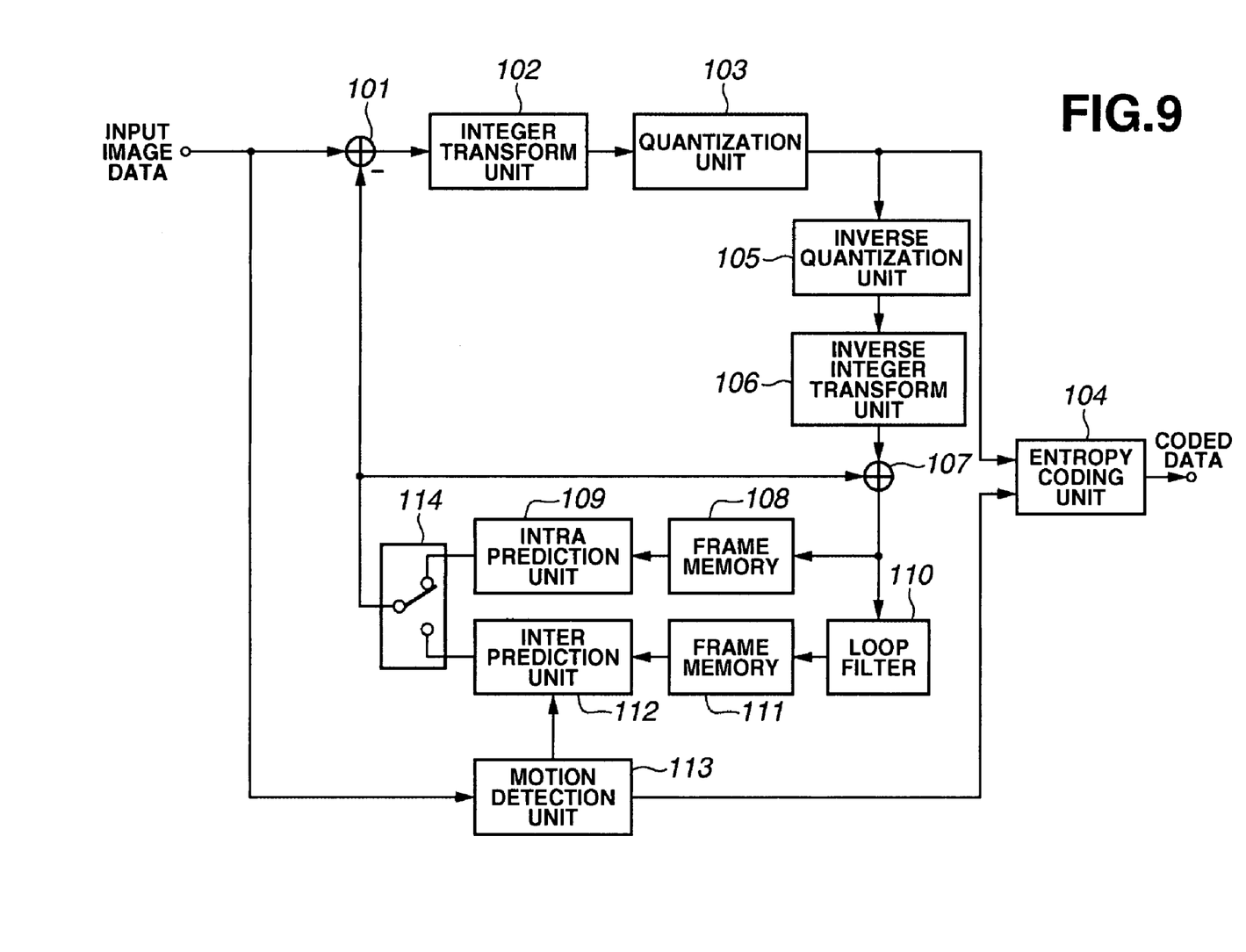
FIG. 9 is a block diagram illustrating an ordinary coding method according to H.264 standard.

The H.264 image coding system is briefly described below by referring to a block diagram of FIG. 9, which shows an image coding apparatus employing the H.264 image coding system. As shown in FIG. 9, the image coding apparatus includes a subtracter 101, an integer transform unit 102, a quantization unit 103, an entropy coding unit 104, an inverse quantization unit 105, an inverse integer transform unit 106, an adder 107, frame memories 108 and 111, an intra prediction unit 109, a loop filter 110, an inter prediction unit 112, a motion detection unit 113, and a switch 114. This apparatus codes input image data and outputs coded data.

The image coding apparatus divides input image data into a plurality of blocks each including a predetermined number of pixels, and performs coding in units of blocks. First, the subtracter 101 subtracts predicted image data from the input image data, and then outputs residual image data. The creation of the predicted image data will be described later.

The integer transform unit 102 performs orthogonal transform on the residual image data output from the subtracter 101, and then outputs transform coefficients. Subsequently, the quantization unit 103 quantizes the transform coefficients by using a predetermined quantization parameter.

The entropy coding unit 104 receives the transform coefficients quantized by the quantization unit 103, and then entropy-codes the received transform coefficients. Subsequently, the entropy coding unit 104 outputs the entropy-coded transform coefficients as coded data.

On the other hand, the transform coefficients quantized by the quantization unit 103 are also used to generate the predicted image data. The inverse quantization unit 105 inverse-quantizes the transform coefficients quantized by the quantization unit 103. Then, the inverse integer transform unit 106 performs inverse-integer-transform of the transform coefficients inverse-quantized by the inverse quantization unit 105, and outputs resultant data as decoded residual image data. Subsequently, the adder 107 adds the decoded residual image data and the predicted image data, which will be described later. Then, the adder,107 outputs a result of the addition as reconstructed image data.

The reconstructed image data is stored in the frame memory 108, and is also filtered by the loop filter 110 to remove noise. The filtered data is stored in the frame memory 111. Among the reconstructed image data, the data, which may be referred to in a subsequent prediction process, is stored in the frame memory 108 or 111 for a period of time.

The intra prediction unit 109 performs an intra prediction process by using the reconstructed image data stored in the frame memory 108 to create predicted image data. The inter prediction unit 112 performs an inter prediction process according to motion vector information concerning a motion vector, which is detected by the motion detection unit 113, by using the reconstructed image data stored in the frame memory 111. Thus, the inter prediction unit 112 generates predicted image data. The motion detection unit 113 detects a motion vector in the input image data, and outputs motion vector information about the detected motion vector to the inter prediction unit 112 and the entropy coding unit 104.

The switch 114 is a selection unit operative to select one of the intra prediction unit 109 and the inter prediction unit 112. That is, the switch 114 selects one of an output of the intra prediction unit 109 and an output of the inter prediction unit 112. Then, the switch 114 outputs predicted image data, which is the selected output of the prediction unit 109 or 112, to the subtracter 101 and the adder 107.

The H.264 standard prescribes that an image coding apparatus has a loop filter operative to perform a filtering process on a locally decoded image differently from the MPEG-1 standard and the MPEG-2 standard. The configuration of the loop filter 110 is described more specifically next.

The loop filter 110 performs smoothing on the boundaries among 4×4 pixel blocks or 16×16 pixel blocks. Thus, the loop filter 110 has advantages that block distortions in the decoded image are removed, and that block distortions in the decoded image are prevented from being transmitted to an image by motion compensation using the decoded image as a reference image. In conformity to the H.264 standard, the strength of a loop filtering process to be performed by the loop filter is controlled according mainly to a quantization value called a Q-value. Also, the strength of the loop filtering process to be performed by the loop filter can be changed according to two parameters "slice_alpha_c0_offset_div2" and "slice_beta_c0_offset_div2" included in a slice header of a slice, into which an image is divided, in units of a slice.

For example, Japanese Patent Application Laid-Open Nos. 6-311499 and 9-187005 disclose related techniques of controlling a filtering process in an encoder.

According to the technique disclosed in Japanese Patent Application Laid-Open No. 6-311499, to use a differential image between an input image and a motion-compensated image as predicted image data, it is determined by using DCT (Discrete Transform Cosine) coefficients obtained through inverse-quantization, that is, DCT coefficients of decoded residual image data whether a distortion occurs. The strength of a filtering process to be performed on the decoded residual image data is controlled according to the magnitude of the distortion. Thus, adaptive removal of distortions is performed.

According to the technique disclosed in Japanese Patent Application Laid-Open No. 9-187005, a quantization scale is changed according to the intensity at an edge of an input image. When the quantization scale is small, a filtering process is performed on DCT coefficients, which are obtained by performing DCT transform on an input image, so as to suppress an increase in an amount of code.

Meanwhile, as described above, in conformity to the H.264 standard, the loop filtering process to be performed by the loop filter is controlled according to the quantization value called the Q-value.

However, the Q-value changes according to buffer capacity. Therefore, the loop filter is not necessarily controlled to reflect human visual characteristics for an image.

Additionally, the filtering-process control method disclosed in Japanese Patent Application Laid-Open No. 6-311499 uses only the DCT coefficients of the decoded residual image data to determine whether a distortion occurs, instead of the reconstructed image data obtained by adding the predicted image data and the decoded residual image data. Thus, the visual characteristics are not reflected in the filtering process. Further, an apparatus disclosed in Japanese Patent Application Laid-Open No. 9-187005 performs a filtering process so as to suppress an increase in an amount of code when the quantization scale is small. However, this apparatus does not perform the filtering process according to the characteristics of an input image. Thus, the filtering process does not reflect the human visual characteristics. That is, the related method and apparatus do not control the filtering process to be suited to the human visual characteristics for an image. Consequently, the related method and apparatus have a drawback in that it is difficult to obtain an image having good quality.

SUMMARY OF THE INVENTION

An aspect of the present invention is to overcome the above-described drawbacks and is, for example, to control a filtering process to obtain a decoded image suited to human visual characteristics.

In one aspect of the present invention, an image coding apparatus includes a determination unit configured to divide input image data into image blocks each including a plurality of pixels, and to determine a characteristic of each image block, a filter unit configured to perform a filtering process on each image block in a locally decoded image associated with the input image data, and a control unit configured to control a property of the filter unit to perform a filtering process on image regions into which the image blocks are sorted according to characteristics of the image blocks determined by the determination unit.

In another aspect of the present invention, an image coding method includes a determination step of dividing input image data into image blocks each including a plurality of pixels, and determining a characteristic of each image block, a filtering step of performing a filtering process on each image block in a locally decoded image associated with the input image data, and a control step of controlling a property of the filtering step when a filtering process is performed on image regions into which the image blocks are sorted according to characteristics of the image blocks determined in the determination step.

In another aspect of the present invention, an image coding apparatus includes a determination unit configured to divide input image data into image blocks each including a plurality of pixels, and to determine a characteristic of each image block by detecting at least an AC component of the image block, a slice construction unit configured to construct at least one slice including one or more of the image blocks, an AC component detected by the determination unit of which is equal to or greater than a predetermined threshold value, a filter unit configured to perform a filtering process on each image block in a locally decoded image associated with the input image data, and a control unit configured to control the filter unit to perform the filtering process on an image block corresponding to the slice constructed by the slice construction unit at a lower strength than a strength at which the filtering process is performed on another image block.

In yet another aspect of the present invention, an image coding method includes a determination step of dividing input image data into image blocks each including a plurality of pixels, and determining a characteristic of each image block by detecting at least AC components of the image block, a slice construction step of constructing at least one slice including one or more of the image blocks, an AC component detected in the determination step of which is equal to or greater than a predetermined threshold value, a filtering step of performing a filtering process on each image block in a locally decoded image associated with the input image data, and a control step of controlling the filtering step to perform a filtering process on an image block corresponding to the slice constructed in the slice construction step at a lower strength than a strength at which the filtering process is performed on another image block.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE EMBODIMENTS

Exemplary embodiments of the invention will be described in detail below with reference to the accompanying drawings.

Figure 1:
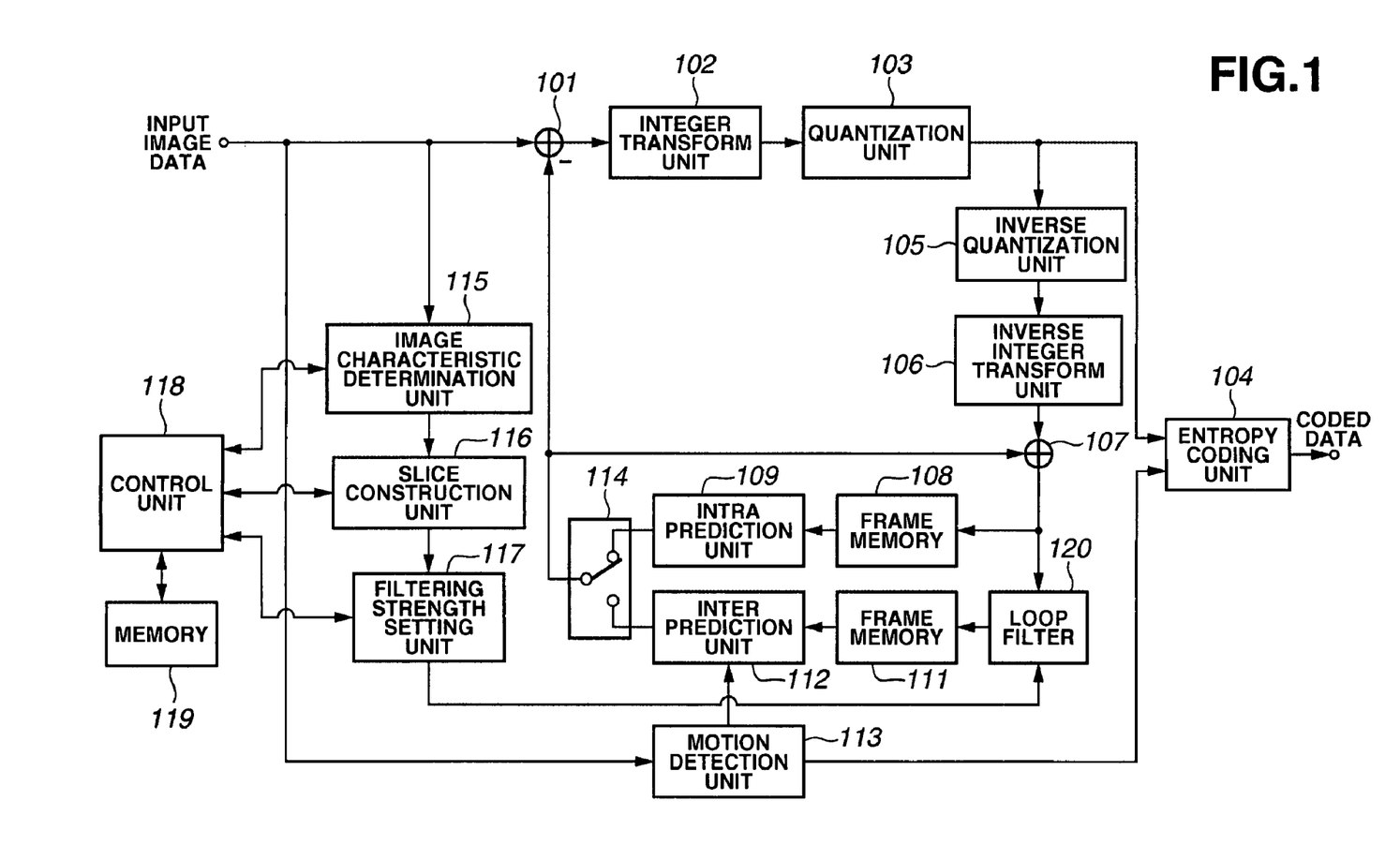
FIG. 1 is a block diagram illustrating an image coding apparatus according an embodiment of the present invention.

FIG. 1 is a block diagram illustrating an image coding apparatus according an exemplary embodiment of the present invention. The image coding apparatus shown in FIG. 1 is configured to encode image data according to H.264 standard. However, as long as the image coding apparatus has a deblocking filter that is equivalent to an H.264 loop filter, the image coding apparatus may use another standard of a coding system.

According to the image coding apparatus shown in FIG. 1, a characteristic of an input image is determined. Then, a coding process is performed while controlling a loop filter according to a result of the determination to perform a loop filtering process suited to an input image. Thus, the apparatus can generate coded data, from which a decoded image reflecting human visual characteristics is obtained. Hereinafter, the configuration of the image coding apparatus shown in FIG. 1 is described. In FIG. 1, blocks which are similar to the blocks shown in FIG. 9 in construction and functions are designated by the same reference numerals as those shown in FIG. 9 and described above. Thus, the description of such blocks is not repeated here for simplicity of description.

In FIG. 1, blocks 101 to 109 and blocks 111 to 114 are the same as those shown in FIG. 9. Additionally, FIG. 1 includes an image characteristic determination unit 115 configured to determine a characteristic of input image data, a slice construction unit 116 configured to construct a slice corresponding to the characteristic of the image according to a result of the determination of the characteristic determined by the image characteristic determination unit 115, and a filtering strength setting unit 117 configured to set the strength of a filtering process to be performed by a loop filter 120 for each of constructed slices according to results of operations respectively performed by the image characteristic determination unit 115 and the slice construction unit 116.

FIG. 1 also includes a control unit 118 configured to control operations of the image characteristic determination unit 115, the slice construction unit 116, and the filtering strength setting unit 117. The control unit 118 performs control operations while using a memory 119. Programs required to perform various processes are stored in the memory 119.

The loop filter 120 is configured to have a structure and functions as those of the loop filter 110 described in FIG. 9, and is capable of changing the filtering process, which is performed by the loop filter 120, in response to a setting instruction from the filtering strength setting unit 117.

Figure 10:
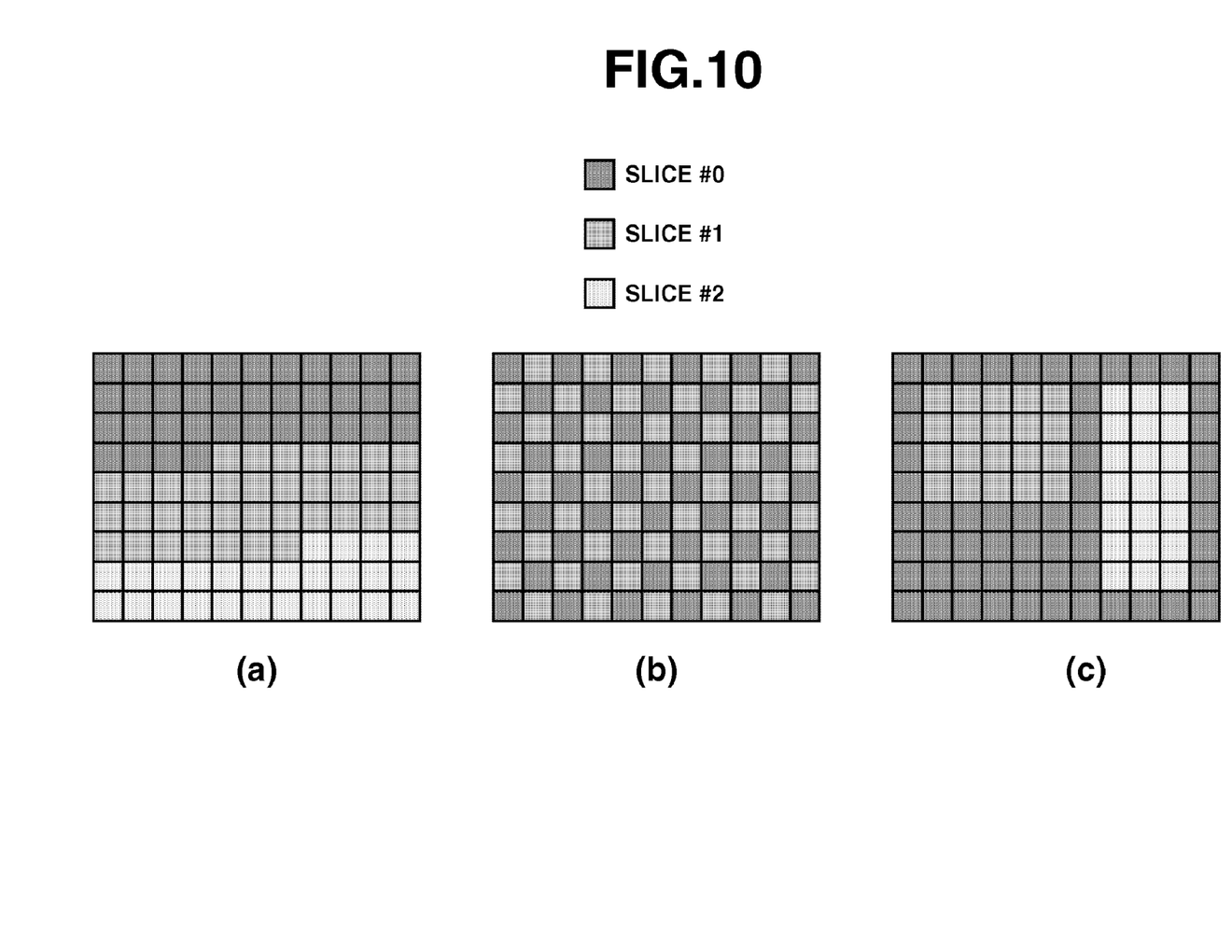
FIG. 10 illustrates examples of slice construction according to the H.264 standard.

The slice constructed according to the H.264 standard is described below with reference to FIG. 10. A slice according to the H.264 standard is a set of one or more 16×16 pixel blocks (hereinafter referred to as macroblocks) in a picture. A picture of one frame (or one field) is a set of one or more slices.

For example, the following methods of constructing slices are used. For example, according to Example (a) shown in FIG. 10, slices are constructed by performing a raster scan of pixels from left to right on each scanning line while the scanning line is serially changed from the top line to the bottom line. Alternatively, according to Example (b) shown in FIG. 10, slices are constructed like a checkered pattern. Alternatively, according to Example (c) shown in FIG. 10, slices are constructed so that window-like slices are arranged in a wall-like slice. The forms of constructible slices are prescribed in a parameter "slice_group_map_type" contained in a slice header. The H.264 standard employs such a flexible slice construction to enable classification of macroblocks into optional slices.

An operation of the image coding apparatus shown in FIG. 1 is described next. In the present exemplary embodiment, the image characteristic determination unit 115 performs Hadamard transform on 16×16 pixel macroblocks, into which input image data is divided, as an orthogonal transform to determine a characteristic of an image. The size of blocks and a device and method used to determine the characteristic of each of the blocks according to the present invention are not limited to those of the present embodiment.

As described above, the image characteristic determination unit 115 performs Hadamard transform on each of the 16×16 pixel macroblocks, into which input image data is divided, and determines the characteristic of the input image data according to obtained Hadamard transform coefficients.

Figure 2:
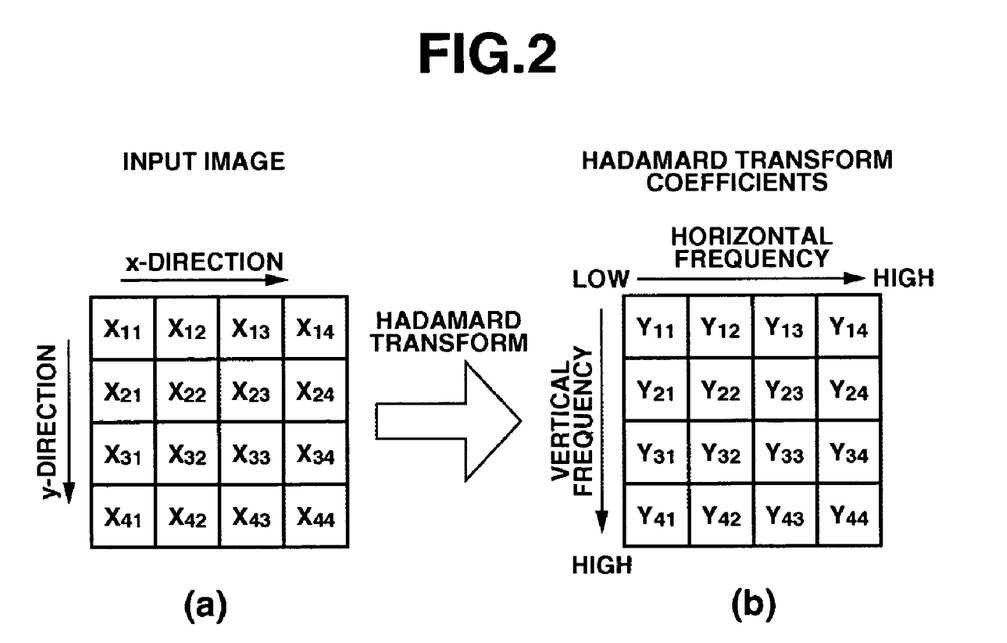
FIG. 2 illustrates Hadamard transform.

Hadamard transform is described now with reference to FIG. 2. For brevity of description, it is assumed that 4×4 Hadamard transform is performed. As described above, Hadamard transform is a type of orthogonal transform. FIG. 2 illustrates an example of performing 4×4 Hadamard transform in the image characteristic determination unit 115. FIG. 2 shows 4×4 pixel input image data (a) and Hadamard transform coefficient array (b) obtained by performing Hadamard transform on the pixel input image data (a). The 4×4 pixel input image data (a) includes sixteen pixels with each of the pixels having a pixel value $X_{11}$ to $X_{44}$. The Hadamard transform coefficient array (b) includes sixteen Hadamard transform coefficients $Y_{11}$ to $Y_{44}$.

Hadamard transform is represented by the following equation:

$$[Y] = [H_4][X][H_4] \quad (1)$$

Where H4 represents a 4×4 Hadamard transform matrix, X denotes an input image signal, and Y designates Hadamard transform coefficient signal.

Further, let $$H_4 = \frac{1}{2}\begin{bmatrix} 1 & 1 & 1 & 1 \\ 1 & 1 & -1 & -1 \\ 1 & -1 & -1 & 1 \\ 1 & -1 & 1 & -1 \end{bmatrix} \quad (2)$$

$$X = \begin{bmatrix} X_{11} & X_{12} & X_{13} & X_{14} \\ X_{21} & X_{22} & X_{23} & X_{24} \\ X_{31} & X_{32} & X_{33} & X_{34} \\ X_{41} & X_{42} & X_{43} & X_{44} \end{bmatrix} \quad (3)$$

$$Y = \begin{bmatrix} Y_{11} & Y_{12} & Y_{13} & Y_{14} \\ Y_{21} & Y_{22} & Y_{23} & Y_{24} \\ Y_{31} & Y_{32} & Y_{33} & Y_{34} \\ Y_{41} & Y_{42} & Y_{43} & Y_{44} \end{bmatrix} \quad (4)$$

Then, the Hadamard transform is defined as follows:

$$\begin{bmatrix} Y_{11} & Y_{12} & Y_{13} & Y_{14} \\ Y_{21} & Y_{22} & Y_{23} & Y_{24} \\ Y_{31} & Y_{32} & Y_{33} & Y_{34} \\ Y_{41} & Y_{42} & Y_{43} & Y_{44} \end{bmatrix} = \frac{1}{4}\begin{bmatrix} 1 & 1 & 1 & 1 \\ 1 & 1 & -1 & -1 \\ 1 & -1 & -1 & 1 \\ 1 & -1 & 1 & -1 \end{bmatrix}\begin{bmatrix} X_{11} & X_{12} & X_{13} & X_{14} \\ X_{21} & X_{22} & X_{23} & X_{24} \\ X_{31} & X_{32} & X_{33} & X_{34} \\ X_{41} & X_{42} & X_{43} & X_{44} \end{bmatrix}\begin{bmatrix} 1 & 1 & 1 & 1 \\ 1 & 1 & -1 & -1 \\ 1 & -1 & -1 & 1 \\ 1 & -1 & 1 & -1 \end{bmatrix} \quad (5)$$

Thus, the Hadamard transform can be achieved by performing one division, one addition and one subtraction. On the left side of the equation (5), $Y_{11}$ represents a DC component (average pixel value for the blocks) of the input image data, and Y12 to Y44 denote Hadamard transform coefficients representing AC components (frequency component) of the input image data.

Figure 3A:
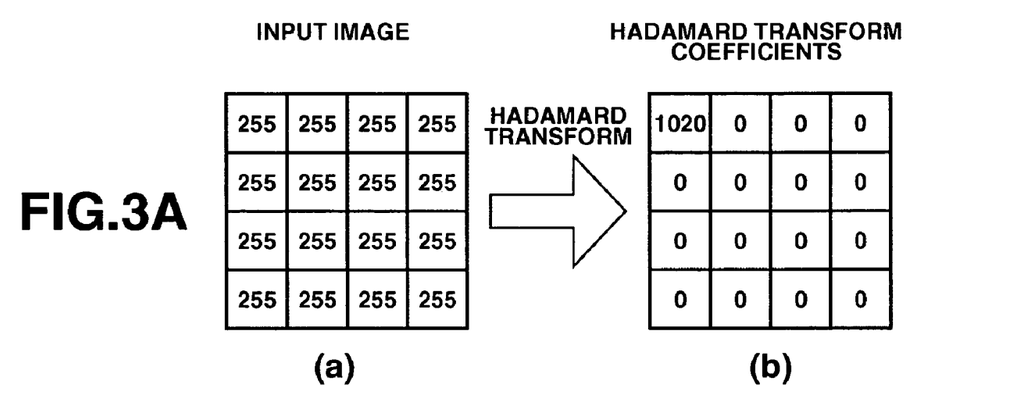
FIGS. 3A and 3B illustrate examples of Hadamard transform.
Figure 3B:
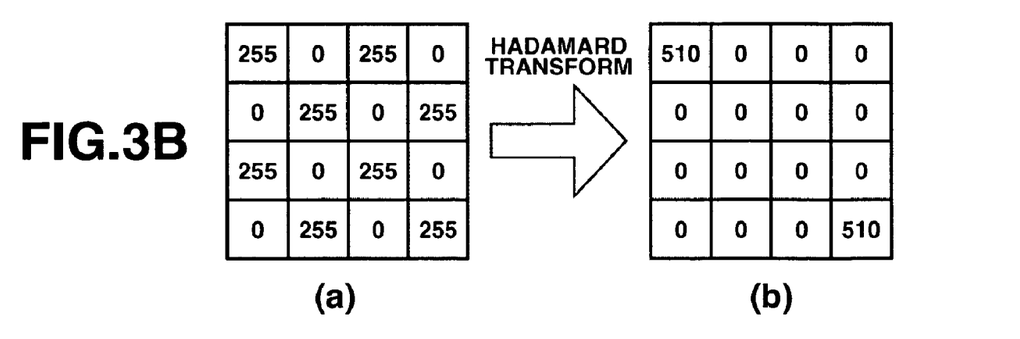

FIGS. 3A and 3B illustrate examples of performing the Hadamard transform on a 4×4 pixel macroblock extracted from input image data adapted to represent the pixel value of each pixel by using 8 bits (that is, the pixel value has 256 gradation levels). Each of FIGS. 3A and 3B shows input image data (a) and Hadamard transform coefficient matrix (b). In a case where an input image block has a uniform gradation level as indicated by the input image data (a) shown in FIG. 3A, a Hadamard coefficient in the matrix (b), which corresponds to the position of $Y_{11}$ in the matrix (b) shown in FIG. 2, is large as shown in FIG. 3A. Also, other Hadamard transform coefficients are 0. Conversely, in a case where an input image block has a complex gradation level pattern as indicated by the input image data (a) shown in FIG. 3B, a Hadamard coefficient in the matrix (b), which corresponds to the position of $Y_{44}$ in the matrix (b) shown in FIG. 2, is large as shown in FIG. 3B. Generally, it is known that in a case where an input image block has a uniform gradation level, a total sum of the Hadamard transform coefficients representing AC components is small, and that conversely, in a case where an input image block has a complex gradation level pattern, a total sum of the Hadamard transform coefficients representing AC components is large.

The image characteristic determination unit 115 determines the characteristics of the input image, that is, a simple and uniform image and a complex image, according to the Hadamard transform coefficients obtained by using this technique and performing the Hadamard transform on the input image data.

Figure 4A:
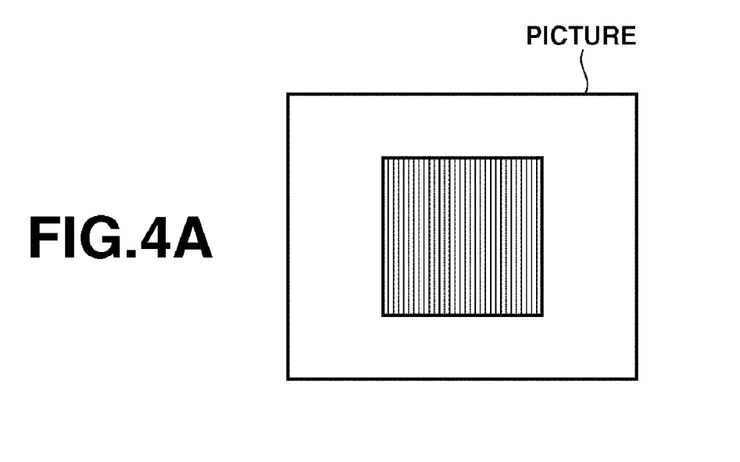
FIG. 4A illustrates an example of an input image.
Figure 4B:
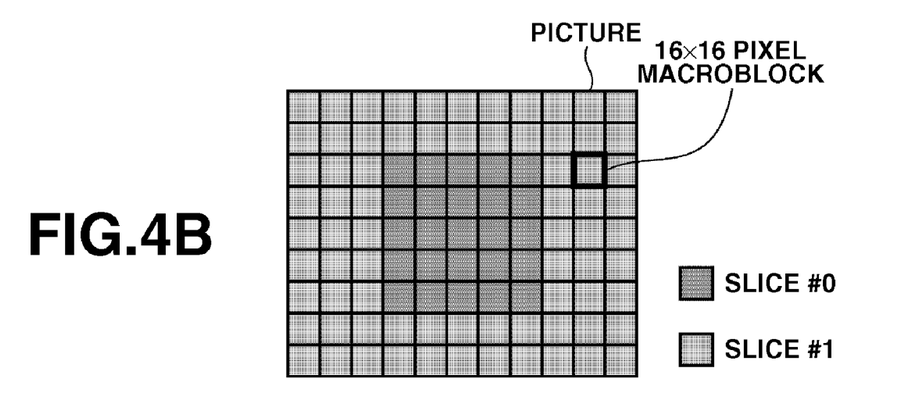
FIG. 4B illustrates a slice construction.

Next, an operation of the slice construction unit 116 shown in FIG. 1 is described. The slice construction unit 116 constructs one or more slices by including macroblocks, which have similar characteristics, in one picture according to a result of the determination made by the image characteristic determination unit 115. FIGS. 4A and 4B illustrate an example of constituting one picture by two slices. The slice construction unit 116 constructs one or more slices by including, for example, 16×16 pixel macroblocks, which have similar characteristics, in one picture according to a result of the determination of the characteristic of each of such macroblocks, which is made by the image characteristic determination unit 115. For example, in a case where one input image picture has a fine vertical-striped image (thus, has a large number of high frequency components) at a central portion thereof and a flat wall-like image (that is, has a small number of high frequency components) at the periphery of the central portion, as shown in FIG. 4A, first, the characteristic of each of the macroblocks corresponding to the central vertical-striped portion is determined to be a complex image. Further, the characteristic of each of the macroblocks corresponding to the periphery of the central portion is determined to be a uniform image. Then, the slice construction unit 116 sorts the macroblocks according to the determined characteristics. Thus, as illustrated in FIG. 4B, the slice construction unit 116 constructs a slice #0 at the central portion of the input image picture, and also constructs a slice #1 at the periphery of the central portion of the picture. In a case where two or more kinds of different image characteristics are determined, the number of slices is increased, so that slices #0, #1, #2, #3 ... are constructed. Thus, the slice construction unit 116 constructs slices according to the image characteristics determined for each macroblock of the input image by using such a technique.

Next, an operation of the filtering strength setting unit 117 shown in FIG. 1 is described. The filtering strength setting unit 117 sets the strength of filtering for each of the slices, which are constructed by the slice construction unit 116, according to the characteristic of the image, which is determined by the image characteristic determination unit 115. The loop filter 120 performs a filtering process on the boundaries among the 16×16 pixel macroblocks according to the strength of filtering set for each slice by the filtering strength setting unit 117.

Hereinafter, the filtering process performed by the loop filter 120 is described with reference to FIGS. 5, 6A, 6B, and 7. For simplicity of description, an example of performing a smooth filtering process using a 3×3 filtering mask as a loop filtering process is described. However, the loop filtering process according to the invention is not limited to this example.

Figure 5:
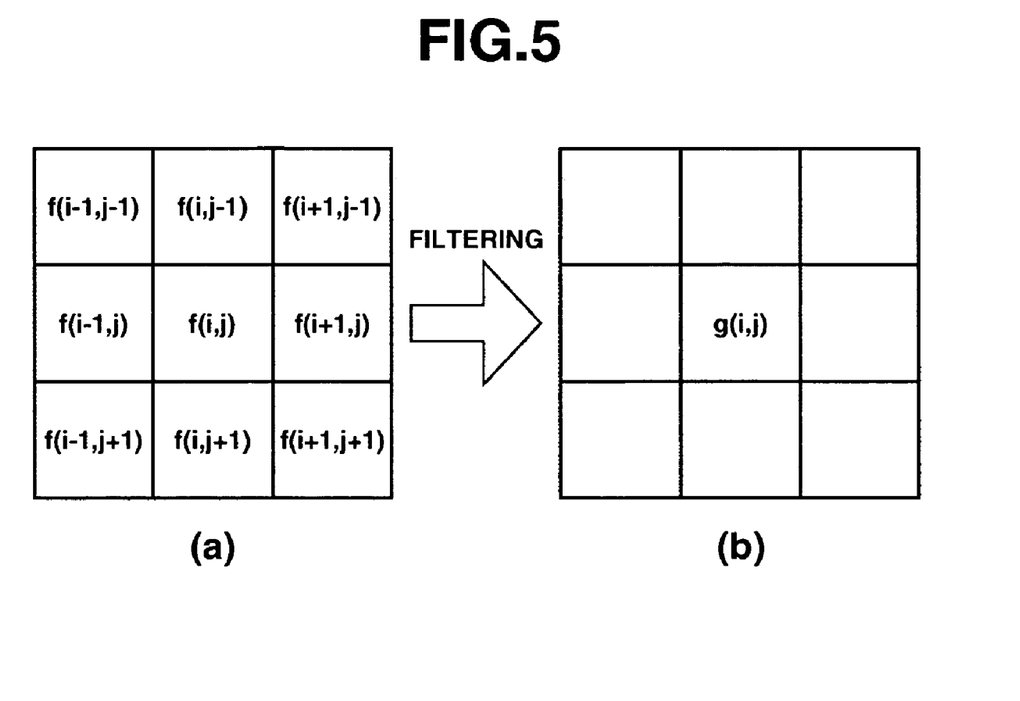
FIG. 5 illustrates a loop filtering process to be performed by a loop filter.

In FIG. 5, f(i, j) shown in a pixel matrix (a) designates a target pixel value on which the filtering process is performed. A new pixel value g(i, j) shown in a new pixel matrix (b), which corresponds to the target pixel value f(i, j) and is obtained by the filtering process, is determined by using the target pixel value and the pixel values of pixels surrounding the target pixel of an image on which the filtering process is not performed yet, that is, nine pixel values f(i−1, j−1), f(i, j−1), f(i+1, j−1), f(i−1, j), f(i, j), f(i+1, j), f(i−1, j+1), f(i, j+1), and f(i+1, j+1) on the 3×3 filtering mask.

Figure 6A:
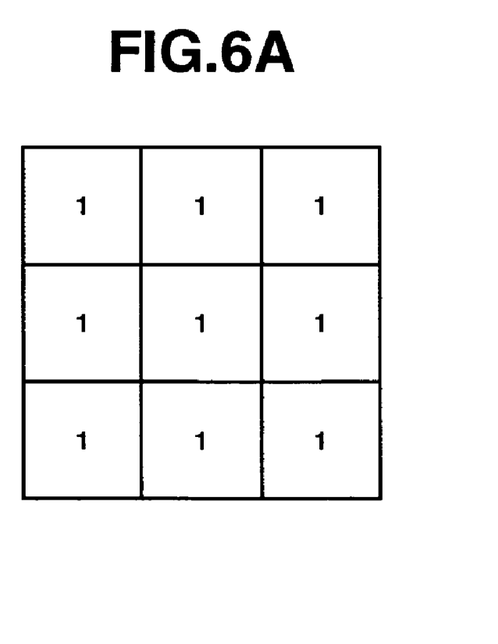
FIGS. 6A and 6B illustrate examples of a 3×3 filtering mask.

Next, the filtering process using the 3×3 filtering mask is described below with reference to FIGS. 6A and 6B. Numerals 1 and 2 shown in FIGS. 6A and 6B denote filtering coefficients to be respectively multiplied by pixel values at corresponding positions. For instance, a pixel value g(i, j), which is obtained by the filtering process using a 3×3 filtering mask shown in FIG. 6A, is given by the following equation (6):

$$g(i, j) = \left\{ \sum_{m=-1}^{1} \sum_{n=-1}^{1} f(i+m, j+n) \right\} \div 9 \quad (6)$$

The difference between the target pixel value and each of the pixel values of the pixels surrounding the target pixel is reduced by performing this filtering process. Thus, a blurred image is obtained.

Figure 6B:
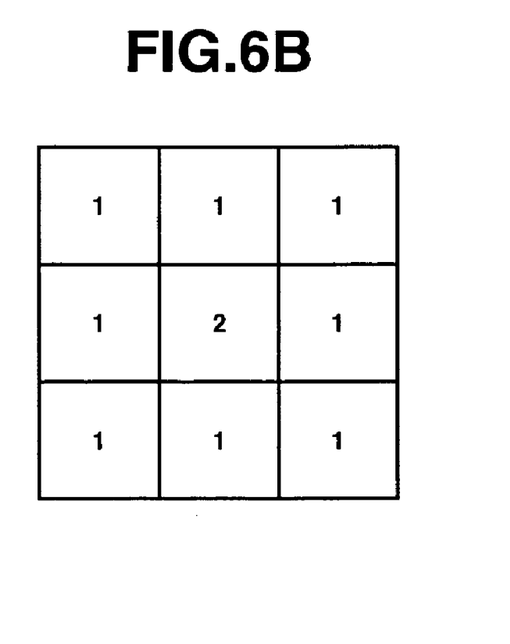

On the other hand, a pixel value g(i, j), which is obtained by the filtering process using a 3×3 filtering mask shown in FIG. 6B, is given by the following equation (7):

$$g(i, j) = \left\{ f(i, j) + \sum_{m=-1}^{1} \sum_{n=-1}^{1} f(i+m, j+n) \right\} \div 10 \quad (7)$$

This filtering process differs from that using the equation (6), which calculates a simple average of the pixel values of the target pixel and the pixels surrounding the target pixel. The filtering process using the equation (7) first sets the weight of the pixel value of the target pixel at a value twice, and thereafter computes the average of the pixels values of the pixels on the filtering mask by dividing a sum of the weighted pixel value of the target pixel and the pixels surrounding the target pixel by 10. As compared with the filtering process using the equation (6), the difference in pixel value between the target value and each of the pixels surrounding the target pixel is increased in the filtering process using the equation (7). That is, in the case of the filtering process using the equation (7), the effectiveness in blurring an image is low. This fact is represented by the expression "the filtering strength is reduced". Conversely, as compared with the filtering process using the equation (7), the strength of the filtering using the equation (6) is strong.

Figure 7:
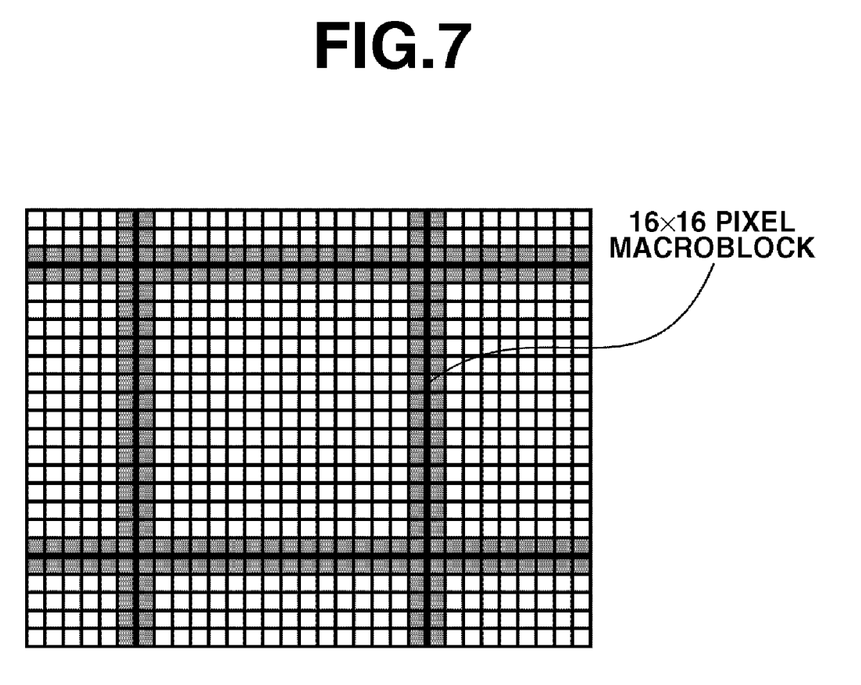
FIG. 7 illustrates pixel values on which a filtering process is performed.

Next, pixels, on which the filtering process is performed, are described with reference to FIG. 7, which is an enlarged view of a part of one picture. Each of regions, which is surrounded by a heavy solid line, is a macroblock. A small square in each macroblock represents one pixel. The aforementioned filtering process is performed by employing one of pixels in a gray portion in FIG. 7 as a target pixel whose pixel value is f(i, j). This process is performed on all of the pixels in the gray portion, that is, block boundary pixels of the 16×16 pixel macroblock. Thus, the difference between the pixel values of the block boundary pixels reduced by performing the filtering process on the block boundary pixels of the 16×16 pixel macroblock. Consequently, block distortions can be reduced.

Next, the setting of the filtering strength is described. The filtering strength setting unit 117 sets different strengths of filtering for the slices, which are constructed by the slice construction unit 116, according to the characteristics of the image, which are determined by the image characteristic determination unit 115. For example, a high strength of the filtering is set for a slice that is a set of macroblocks, each of which is determined to have a "uniform" characteristic, in which degradation of the visual characteristics, for example, a block distortion, is noticeable. Conversely, a low strength of the filtering is set for a slice that is a set of macroblocks, each of which is determined to have a "complex" characteristic, in which degradation of the visual characteristics is unobtrusive. That is, more specifically, referring to FIG. 4B, a high strength of filtering is set for a slice #1 that is an image region having a uniform pixel value (that is, an image region having a small number of high frequency components). A low strength of filtering is set for a slice #0 that is an image region having a complex pattern of pixel values (that is, an image region having a large number of high frequency components). The strength of filtering by the loop filter 120 can be set by applying the techniques described with reference to FIGS. 6A and 6B thereto. The loop filter 120 receives setting information from the filtering strength setting unit 117 and changes the property of the filtering process according to the setting information. Thus, the loop filter 120 performs an adaptive filtering process by changing the filtering process corresponding to each slice.

An image, which is adaptively filtered according to the characteristic or pattern of the image, that is, a favorable image, which reflects the human visual characteristics, can be restored by decoding coded data, which is generated by the image coding apparatus according to the present embodiment, through the use of a decoder (not shown).

Figure 8:
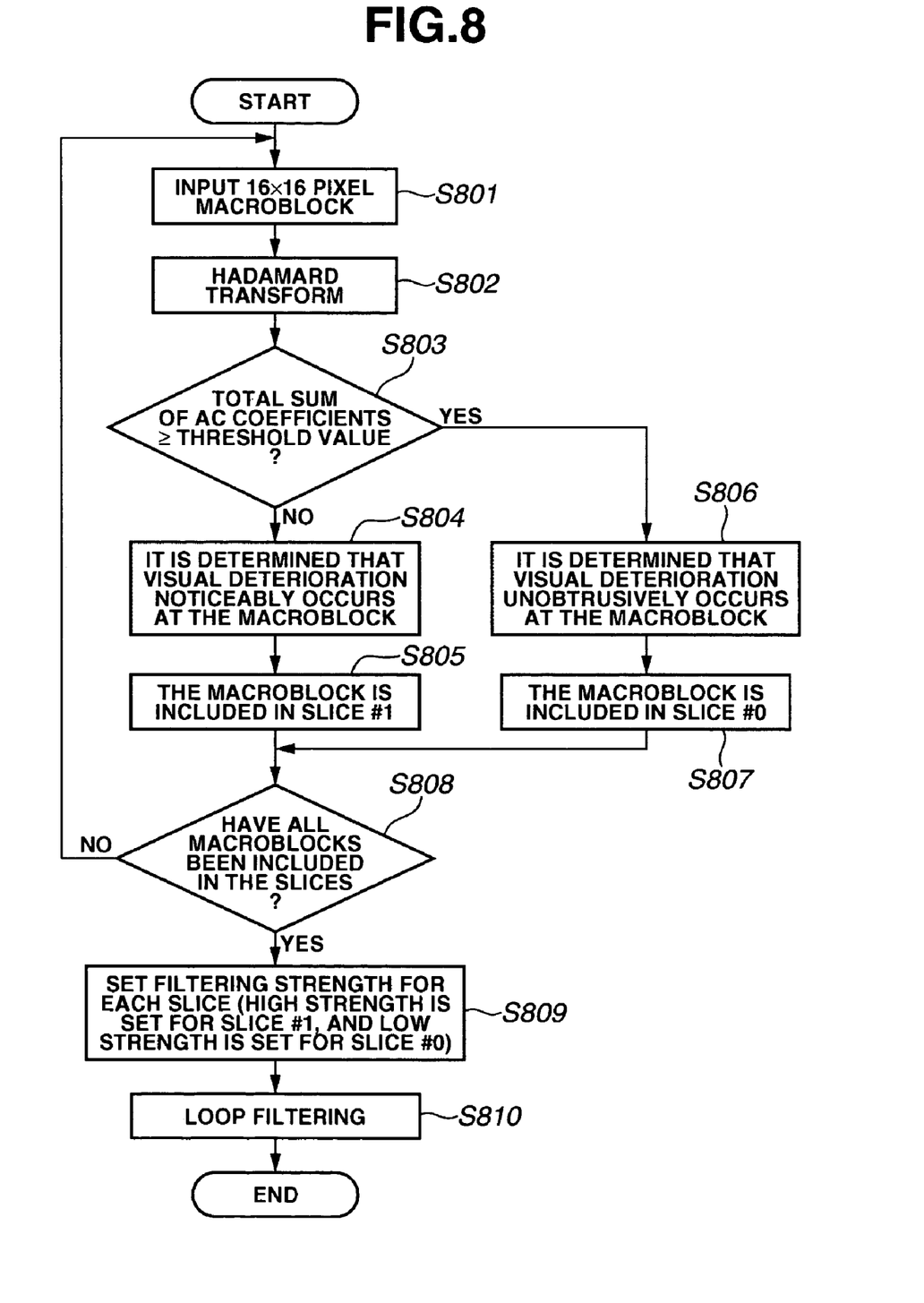
FIG. 8 is a flowchart illustrating an operation of controlling the filtering process.

Next, a control procedure for the filtering process by the loop filter 120 in the image coding apparatus, which has been described above, is described with reference to a flowchart shown in FIG. 8. The flowchart shown in FIG. 8 relates to a control operation performed by the control unit 118 shown in FIG. 1, and illustrates a flow of a control program to be executed.

First, in step S801, the image characteristic determination unit 115 receives input image data, for example, an image block (that is, a 16×16 pixel block), which is obtained by partitioning the pixels of the input image data in units of 16×16 pixels. Then, in step S802, the image characteristic determination unit 115 performs Hadamard transform on the image block. Subsequently, in step S803, the image characteristic determination unit 115 calculates a total sum of Hadamard transform coefficients representing AC components which are obtained by the Hadamard transform. If the total sum is less than a threshold value (no in step S803), the image characteristic determination unit 115 determines in step S804 that visual deterioration noticeably occurs at this image block (that is, this image block is regarded as having a uniform pixel value). In this case, in step S805, the slice construction unit 116 sets this image block to be included in a slice #1. On the other hand, if the total sum is equal to or greater than the threshold value (yes in step S803), the image characteristic determination unit 115 determines in step S806 that visual deterioration unobtrusively occurs at this image block (that is, this image block is regarded as having a complex pixel value pattern). In this case, in step S807, the slice construction unit 116 sets this image block to be included in a slice #0.

Then, in step S808, it is determined whether all of the macroblocks of one picture have been set to be included in the slices. If not, the process returns to step S801. Thus, the aforementioned operation is iteratively performed on the image blocks until all of the macroblocks of one picture are set to be included in the slices. If all of the macroblocks of one picture have been set to be included in the slices (yes in step S808), in step S809, the filtering strength setting unit 117 sets a high strength of the filtering for the slice #1 that includes the image blocks, at each of which visual deterioration noticeably occurs, to be regarded as having a uniform pixel value. Also, the filtering strength setting unit 117 sets a low strength of the filtering for the slice #0 that includes the image blocks, at each of which visual deterioration unobtrusively occurs, to be regarded as having a complex pixel value pattern. Then, in step S810, the loop filter 120 adaptively performs smooth filtering on the block boundaries in each slice according to the property based on the strength of the filtering, which is set for each slice. Thus, the process illustrated in the flowchart shown in FIG. 8 is finished.

In the foregoing description of the present exemplary embodiment, a case in which data representing one picture is used as the input image data has been described by way of example. Because a moving image includes a plurality of pictures, a similar operation is iteratively performed on the plurality of pictures (frames or fields) in a predetermined cycle.

Although the filtering is performed by setting the low strength of the filtering for the slice constructed as a set of image blocks, at each of which visual deterioration unobtrusively occurs, in the aforementioned coding apparatus, the coding apparatus may be configured so that no filtering process is performed on such a slice.

Although the present embodiment employs the uniformity of pixel values and the complexity in change of the pixel value as the characteristic of each image block, the present embodiment may be modified so that the determination of the uniformity or the complexity is performed in multiple stages. The present invention covers a case where characteristics, such as a luminance distribution, a color distribution, and an edge, other than the uniformity and the complexity are used as the characteristic of the image.

Thus, according to the image coding apparatus of the present embodiment, the loop filtering process can be controlled directly corresponding to the characteristic of an input image. Thus, the loop filtering process can be controlled to be suited to the human visual characteristic. Consequently, the present embodiment has an advantage in that a good image reflecting human visual characteristics can be obtained.

The present invention is achieved by supplying a storage medium (or a recording medium), on which software (program code) implementing the functions of the embodiment is recorded, to a system or an apparatus and by causing a computer (or a CPU or an micro-processing unit (MPU)) of the system or the apparatus to read the program code from the storage medium and to execute the read program code. In this case, the program code itself read from the storage medium implements the functions of the aforementioned embodiment. The present invention includes not only a case where the program code is executed by the computer to implement the functions of the aforementioned embodiment, but a case where an operating system (OS) running on the computer entirely or partly performs actual processes according to instructions, which are issued by the program code, to implement the functions of the aforementioned embodiment. In addition, the storage medium, which stores the program code, includes a flexible disk, a hard disk, a read-only memory (ROM), a random access memory (RAM), magnetic tape, a non-volatile memory card, a compact disc—read-only memory (CD-ROM), a compact disc—recordable (CD-R), a digital versatile disc (DVD), a Blu-ray disc, and other kinds of optical disks, and magneto-optical disks.

The present invention further covers a case where the program code read from the storage medium is stored in a memory included in a function expansion card inserted into a computer or a function expansion unit connected to a computer, and a CPU installed in the expansion card or in the expansion unit entirely or partly performs the actual processes according to instructions issued from the program code to implement the functions of the aforementioned embodiment.

In a case where the present invention is applied to the storage medium, the storage medium stores the program code corresponding to the aforementioned flowchart.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2004-297707 filed Oct. 12, 2004, which is hereby incorporated by reference herein in its entirety.

What is claimed is:

1. An image predictive coding apparatus comprising:
   a prediction unit that performs an inter prediction process using an inter prediction unit or an intra prediction process using an intra prediction unit, and creates predicted image data;
   a locally decoding unit, including an inverse quantization unit, an inverse transform unit and an adder, that creates a locally decoded image by synthesizing input image data, which is quantized and inverse-quantized, and the predicted image data, and supplies the locally decoded image to the prediction unit;
   an image characteristic determination unit that divides input image data, which is not yet processed by the prediction unit and the locally decoding unit, into image blocks each including a plurality of pixels, and determines a characteristic to represent uniformity or complexity of each image block;
   a filter unit that performs a filtering process on each image block in the locally decoded image;
   a control unit that controls the filter unit according to a determination result of the image characteristic determination unit so that different filtering properties are set in a first image region corresponding to image blocks having the characteristic of uniformity and a second image region corresponding to image blocks having the characteristic of complexity when the filter unit performs the filtering process on the locally decoded image corresponding to the input image data determined by the image characteristic determination unit;
   a slice construction unit that constructs at least two slices corresponding to the first image region and the second image region, wherein the slice means a unit of filtering in the filter unit, and each slice includes one or more of the image blocks; and
   a filter setting unit that sets a strength of filtering in the filter unit,
   wherein the control unit causes the filter setting unit to set a different strength of filtering in the filter unit for each slice constructed by the slice construction unit.

2. The image predictive coding apparatus according to claim 1, wherein the control unit controls the filter unit to change a property corresponding to each slice constructed by the slice construction unit.

3. The image predictive coding apparatus according to claim 1, wherein the image characteristic determination unit performs an orthogonal transform on the image block, determines an image block having the characteristic of uniformity when a total sum of AC components of transform coefficients obtained by performing the orthogonal transform is less than a predetermined threshold value, and determines an image block having the characteristic of complexity when a total sum of AC components of transform coefficients obtained by performing the orthogonal transform is equal to or greater than the predetermined threshold value.

4. The image predictive coding apparatus according to claim 3,
   wherein the control unit causes the filter setting unit to set a higher strength of filtering to the first image region and a lower strength of filtering to the second image region.

5. The image predictive coding apparatus according to claim 1, wherein the image characteristic determination unit performs Hadamard transform on the image block, determines an image block having the characteristic of uniformity when a total sum of AC components of transform coefficients obtained by performing the Hadamard transform is less than a predetermined threshold value, and determines an image block having the characteristic of complexity when a total sum of AC components of transform coefficients obtained by performing the Hadamard transform is equal to or greater than the predetermined threshold value.

6. The image predictive coding apparatus according to claim 5,
   wherein the control unit causes the filter setting unit to set a higher strength of filtering to the first image region and a lower strength of filtering to the second image region.

7. The image predictive coding apparatus according to claim 1, wherein the filter unit performs smooth filtering process on a boundary of each image block of the locally decoded image.

8. The image predictive coding apparatus according to claim 1, wherein the image characteristic unit determines the characteristic to represent complexity of each block by detecting at least an AC component of the image block.

9. An image predictive coding method performed by an image predictive coding apparatus, the image predictive coding method comprising:

a prediction step of performing an inter prediction process by an inter prediction unit or an intra prediction process performed by an intra prediction unit and creating predicted image data;

a locally decoding step of creating a locally decoded image by synthesizing input image data, which is quantized by a quantization unit and inverse-quantized by an inverse quantization unit, and the predicted image data created by the prediction step, and supplying the locally decoded image data to the prediction step;

a determination step, performed by an image characteristic unit, of dividing input image data, which is not yet processed by the prediction step and the locally decoding step, into image blocks each including a plurality of pixels, and determining a characteristic, by an image characteristic determination unit, to represent uniformity or complexity of each image block;

a filtering step of performing a filtering process on each image block in the locally decoded image;

a control step, performed by a control unit, of controlling the filtering step according to a determination result of the determination step so that different filtering properties are set in a first image region corresponding to the image blocks having the characteristic of uniformity and a second image region corresponding to image blocks having the characteristic of complexity when the filtering step performs the filtering process on the locally decoded image corresponding to the input image data determined in the determination steps a slice construction step of constructing at least two slices corresponding to the first image region and the second image region, wherein the slice means a unit of filtering in the filter step, and each slice includes one or more of the image blocks; and a filter setting step that sets a strength of filtering, wherein the control step causes the filter setting step to set a different strength of filtering for each slice constructed in the slice construction step.

10. The image predictive coding method according to claim 9, wherein the control step controls the filtering step to change a property corresponding to each slice constructed in the slice construction step.

11. The image predictive coding method according to claim 9, wherein the determination step performs an orthogonal transform on the image block, determines an image block having the characteristic of uniformity when a total sum of AC components of transform coefficients obtained by performing the orthogonal transform is less than a predetermined threshold value, and determines an image block having the characteristic of complexity when a total sum of AC components of transform coefficients obtained by performing the orthogonal transform is equal to or greater than the predetermined threshold value.

12. The image predictive coding method according to claim 11, wherein the control step causes the filter setting step to set a higher strength of filtering to the first image region and a lower strength of filtering to the second image region.

13. The image predictive coding method according to claim 9, wherein the determination step performs Hadamard transform on the image block, determines an image block having the characteristic of uniformity when a total sum of AC components of transform coefficients obtained by performing the Hadamard transform is less than a predetermined threshold value, and determines an image block having the characteristic of complexity when a total sum of AC components of transform coefficients obtained by performing the Hadamard transform is equal to or greater than the predetermined threshold value.

14. The image predictive coding method according to claim 13, wherein the control step causes the filter setting unit to set a higher strength of filtering to the first image region and a lower strength of filtering to the second image region.

15. The image predictive coding method according to claim 9, wherein the filter step performs smooth filtering process on a boundary of each image block of the locally decoded image.

16. The image predictive coding method according to claim 9, wherein the determination step determines the characteristic to represent complexity of each block by detecting at least an AC component of the image block.

17. A computer-readable storage medium having stored thereon a program for performing an image predictive coding method by an image predictive coding apparatus, the image predictive coding method comprising:

a prediction step of performing an inter prediction process by an inter prediction unit or an intra prediction process performed by an intra prediction unit and creating predicted image data;

a locally decoding step of creating a locally decoded image by synthesizing input image data, which is quantized by a quantization unit and inverse-quantized by an inverse quantization unit, and the predicted image data created by the prediction step, and supplying the locally decoded image data to the prediction step;

a determination step, performed by an image characteristic unit, of dividing input image data, which is not yet processed by the prediction step and the locally decoding step, into image blocks each including a plurality of pixels, and determining a characteristic, by an image characteristic determination unit, to represent uniformity or complexity of each image block;

a filtering step of performing a filtering process on each image block in the locally decoded image;

a control step, performed by a control unit, of controlling the filtering step according to a determination result of the determination step so that different filtering properties are set in a first image region corresponding to the image blocks having the characteristic of uniformity and a second image region corresponding to image blocks having the characteristic of complexity when the filtering step performs the filtering process on the locally decoded image corresponding to the input image data determined in the determination step;

a slice construction step of constructing at least two slices corresponding to the first image region and the second image region, wherein the slice means a unit of filtering in the filter step, and each slice includes one or more of the image blocks; and a filter setting step that sets a strength of filtering, wherein the control step causes the filter setting step to set a different strength of filtering for each slice constructed in the slice construction step.

* * * * *